United States Patent [19]

Konuma et al.

[11] Patent Number: 5,196,955
[45] Date of Patent: Mar. 23, 1993

[54] FERROELECTRIC LIQUID CRYSTAL OPTICAL DEVICE WITH VISCOSITY NOT MORE THAN 30000 CPS

[75] Inventors: Toshimitsu Konuma, Kanagawa; Shunpei Yamazaki, Tokyo; Toshimitsu Hagiwara, Kanagawa; Hitoshi Kondou, Tokyo, all of Japan

[73] Assignees: Semiconductor Energy Laboratory Co., Ltd., Kanagawa; Takasago International Corporation, Tokyo, both of Japan

[21] Appl. No.: 703,097

[22] Filed: May 22, 1991

[30] Foreign Application Priority Data

May 24, 1990 [JP] Japan .................................. 2-134441
May 24, 1990 [JP] Japan .................................. 2-134442

[51] Int. Cl.⁵ .................... G02F 1/13; G02F 1/1337
[52] U.S. Cl. ..................................... 359/100; 359/78
[58] Field of Search ................... 359/86, 100, 75, 78

[56] References Cited

U.S. PATENT DOCUMENTS

| | | | |
|---|---|---|---|
| 4,902,107 | 2/1990 | Tsuboyama et al. | 359/86 |
| 4,917,469 | 4/1990 | Ross | 359/86 |
| 4,923,285 | 5/1990 | Ogino et al. | 359/86 |
| 5,033,822 | 7/1991 | Ooki et al. | 359/86 |
| 5,071,589 | 12/1991 | Dübal et al. | 359/103 |

Primary Examiner—William L. Sikes
Assistant Examiner—Anita Pellman Gross
Attorney, Agent, or Firm—Sixbey, Friedman, Leedom & Ferguson

[57] ABSTRACT

An improved liquid crystal optical device utilizing a ferroelectric liquid crystal and a driving method for the same are described. A ferroelectric liquid crystal material disposed between a pair of substrates in the optical device has a coefficient of viscosity of 5000 cps to 30000 cps and a negative dielectric anisotropy at operational temperatures, e.g. between 10° C. and 40° C. The liquid crystal consists of a number of layers normal to the substrates. The constituent layer in turn consists of liquid crystal molecules parallel to the substrates. Misalignment of the molecules yields bends in the layered structure which degrades the contrast ratio. When given alternating electric fields, the molecules are subjected to an electric torque which exerts thereon in order to force the molecules parallel to the substrate by virtue of the negative dielectric anisotropy so that the bends can be removed.

10 Claims, 5 Drawing Sheets

FERROELECTRIC LIQUID CRYSTAL OPTICAL DEVICE WITH VISCOSITY NOT MORE THAN 30000 CPS

BACKGROUND OF THE INVENTION

1. Field of the Invention

The present invention relates to a liquid crystal device and a method of driving the same. More particularly, it relates to such a liquid crystal optical device and a method of driving the same wherein formation of undesirable bends are unlikely in liquid crystal layered structure.

2. Description of the Prior Art

As compared with twisted liquid crystal displays broadly used, ferroelectric liquid crystal displays have attractive advantages such as quick response and wide viewing angles. A ferroelectric liquid crystal material is disposed between substrates in the form of a layered structure consisting of a number of liquid crystal layers. The layers of the liquid crystal are arranged in parallel to each other and normal to the substrate, and have a tendency of being bent between the substrates as illustrated in FIG. 1. The bends appear as undesirable optical defects in controlled molecular orientation at the positions where the directions of bend are changed, resulting in reduction of contrast of images. It is very difficult to remove such bends from the layered structure and the bends continue to degrade the contrast during its operation.

In order to reform the layered structure, the pretilt angle between the inside contiguous surface of the substrate and the directors (long axes) of the liquid crystal molecules has to be decreased as small as possible so that the molecules 13 become in parallel to the inside surface. Liquid crystal molecules have dielectric anisotropy $\Delta\epsilon$ ($\Delta\epsilon = \epsilon_1 - \epsilon_2$; $\epsilon_1$ is a dielectric constant in the direction parallel to molecular long axis; and $\epsilon_2$ is a dielectric constant in the direction perpendicular to the molecular long axis). If the dielectric anisotropy $\Delta\epsilon$ is negative, an electrical torque proportional to $\Delta\epsilon E^2$ (E: external electric field) can be exerted upon the molecules in order to force the directors to be parallel to the surface by applying alternating electric fields between the substrates. The torque is exerted upon the molecules, however, in order to inversely erect the directors normal to the substrate if the dielectric anisotropy is positive. Accordingly, there have remained such bends in conventional structures resulting in poor contrast.

The viscosity of a liquid crystal material makes it furthermore difficult to reform the layered structure.

The volume of the liquid crystal material contracts between the substrate as the temperature is descended, often resulting in the formation of void spaces in the layered structure, called tree-like defects. If the viscosity of the liquid crystal is high, the formation of the void space is more likely. While a ferroelectric liquid crystal has a memory characteristic, the viscosity makes it difficult to change the optical property of the liquid crystal material at a selected pixel after the optical property thereof is continuously maintained for a relatively long time, resulting in an afterimage and a poor contrast.

Furthermore, orientation control films provided on the contiguous surfaces of the substrates have relatively large resistances and therefore tend to collect ionized impurities thereon or therein which have been charged with the opposite polarity to that of the spontaneous polarization of the ferroelectric liquid crystal. For this reason, there is formed an electric field in the liquid crystal layers even when no external voltage is applied between the substrates, resulting in a monostability and twisted orientation of the liquid crystal which inherently has a bistability.

The voltage level of the control signals applied to the liquid crystal display has been adjusted in accordance with the surrounding temperature to maintain driving performance. However, when the voltage level of the control signals is decreased at high driving temperatures, the electric force $\Delta\epsilon E^2$ is decreased so that undesirable bends tend to remain.

BRIEF SUMMARY OF THE INVENTION

It is an object of the present invention to provide an improved liquid crystal optical device and a method of driving the same utilizing a ferroelectric liquid crystal material.

It is another object of the present invention to provide an improved liquid crystal optical device and a method of driving the same having a ferroelectric liquid crystal material which can construct clear images.

It is a further object of the present invention to provide an improved liquid crystal device and a method of driving the same having a ferroelectric liquid crystal material which does not form bends in its layered structure.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, the ferroelectric liquid crystal material disposed between a pair of substrates in the device has a coefficient of viscosity of 5000 cps to 30000 cps and a negative dielectric anisotropy at operational temperatures, e.g. between 10° C. and 40° C. The liquid crystal consists of a number of layers normal to the substrates. The constituent layer in turn consists of liquid crystal molecules arranged parallel to the substrates. Misalignment of the molecules yields bends in the layered structure as illustrated in FIG. 1. When given alternating electric fields, e.g. as driving signals, the molecules are subjected to an electric torque which exerts thereon in order to make the molecules parallel to the substrate by virtue of the negative dielectric anisotropy as illustrated in FIG. 3. The magnitude of the torque is proportional to $\Delta\epsilon E^2$ (E is external electric field and $\Delta\epsilon = \epsilon_1 - \epsilon_2$; $\epsilon_1$ is a dielectric constant in the direction parallel to molecular long axis; and $\epsilon_2$ is a dielectric constant in the direction perpendicular to the molecular long axis.). The realigning action of the electric torque, however, is made ineffective when the coefficient of viscosity of the liquid crystal exceeds 30000 cps. In addition to this, the thickness of an orientation control film is preferably selected to be no larger than 200 Å so as not to collect undersirable electric charge on the surface of the film.

In the operation of the liquid crystal device, alternating driving signals are applied to the liquid crystal layers. The frequency of the signal is adjusted in accordance with the temperature of the liquid crystal. This adjustment of the frequency is equivalent to the control of the effective voltage of the driving signals. In actual cases, the frequency is increased as the temperature increases. By this driving method, the contrast ratio is maintained no lower than 10 between −3° C. and 40° C. Accordingly the contrast ratio is maintained no lower than 10 also in the usual operation temperature range of 10° C. to 40° C.

BRIEF DESCRIPTION OF THE DRAWINGS

The accompanying drawings, which are incorporated in and form a part of the invention and, together with the description, serve to explain the principles of the invention.

DETAILED DESCRIPTION OF THE PREFERRED EMBODIMENTS

Figure 1:
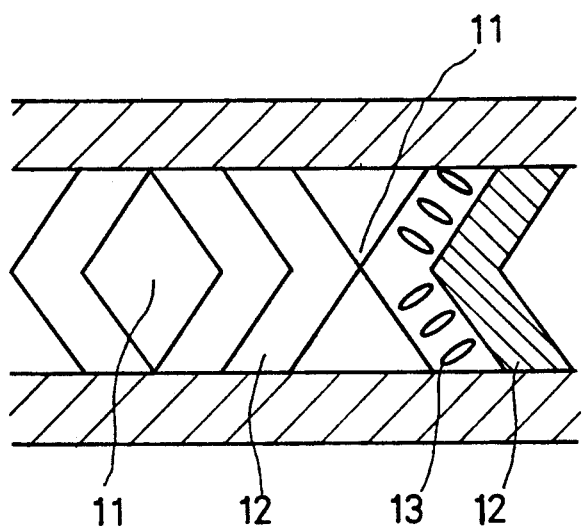
FIG. 1 is a schematic diagram showing undesirable bends of liquid crystal layers.
Figure 2:
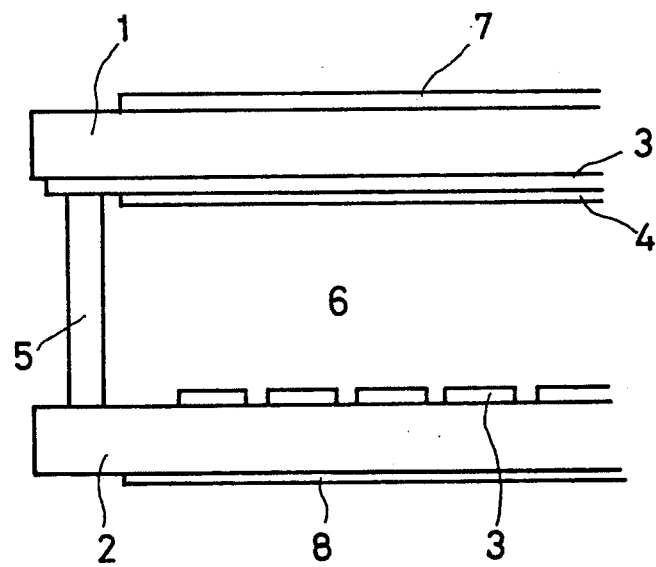
FIG. 2 is a partial cross sectional view showing a liquid crystal display in accordance with the present invention.
Figure 3:
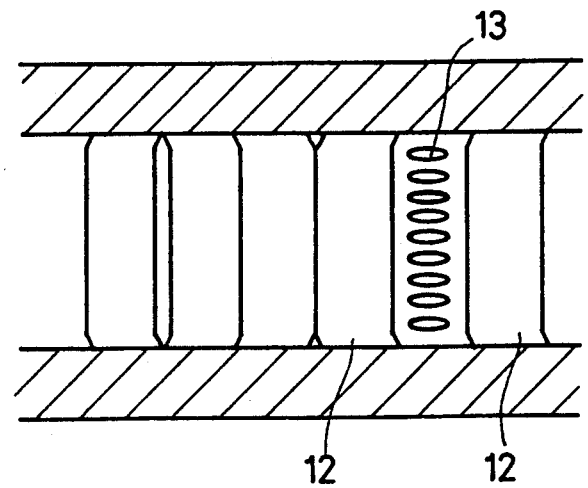
FIG. 3 is an explanatory view showing liquid crystal layers in accordance with the present invention.
Figure 4:
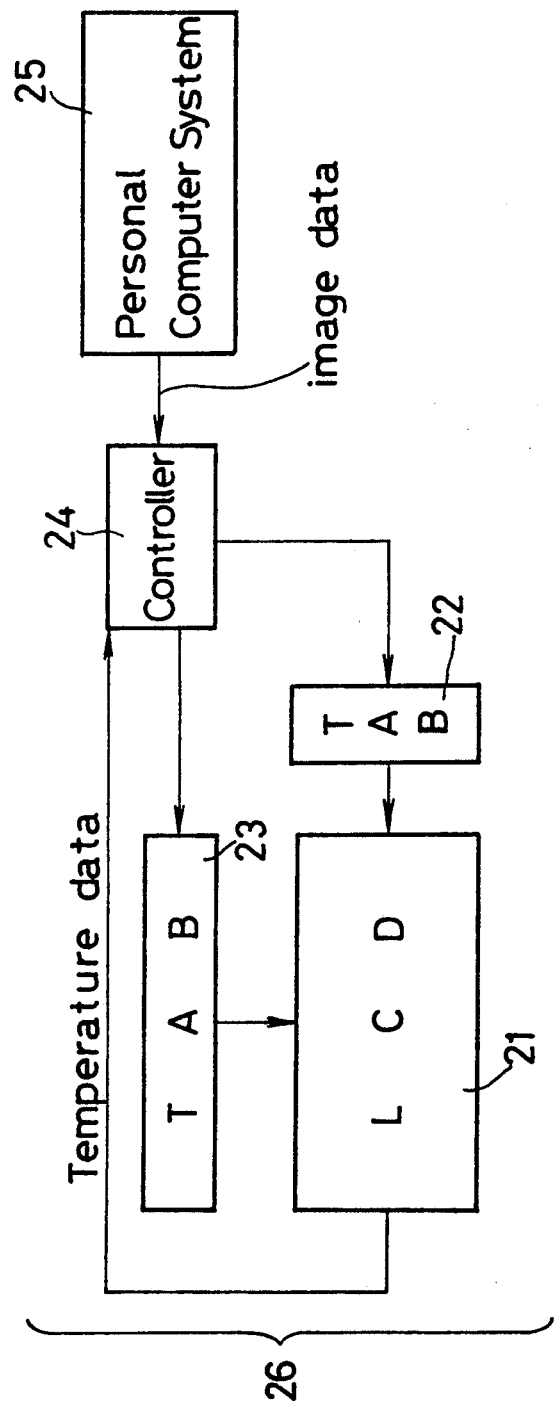
FIG. 4 is a block diagram showing an experimental system used in an embodiment of the present invention.

Referring now to FIG. 2 and FIG. 4, a liquid crystal display (LCD) 21 utilizing a ferroelectric liquid crystal in accordance with a preferred embodiment of the present invention will be explained.

The display 21 comprises a pair of substrates 1 and 2 made of a transparent sodalime glass plate. ITO films of 1200 Å thickness are deposited by DC magnetron sputtering on the inside surfaces of these substrates 1 and 2 and patterned by a known photolithography in order to form transparent conductive patterns 3 necessary to induce an electric field therebetween required for driving the display. The conductive patterns are provided in the form of an electrode arrangement, e.g. diagonal sets of parallel strips, in order to define a plurality of pixels in a matrix form. The inside surface of the substrate 1 is then coated with polyimide thin film 4 of 150 Å by applying over the electrode arrangement an N-methyl-2-pyrrolidone solution of polyamic acid by offset printing and heating the thin films at 250° C. for 3 hours. Suitable rubbing treatment is given to the polyimide films 4 by means of a cotton cloth applied to a roller in order to form an orientation control surface. Spacers consisting of hard particles of 2 μm diameter are applied to the inside surface of the substrate 2. The peripheral inside of the substrate 1 is provided with a sealing member 5 made of an epoxy-based thermosetting adhesive by screen printing. The pair of these substrates 1 and 2 are joined with the adhesive therebetween and heated under pressure in order to harden the adhesive. A ferroelectric liquid crystal is disposed between the substrates 1 and 2 through an opening provided in the sealing member 5, which is closed thereafter by means of a UV-light setting resin. Finally, a pair of polarizing plates 7 and 8 are placed on the opposite outside surfaces of the substrates. By the display 21, a white-black display is experimentally carried out as follows.

Figure 5:
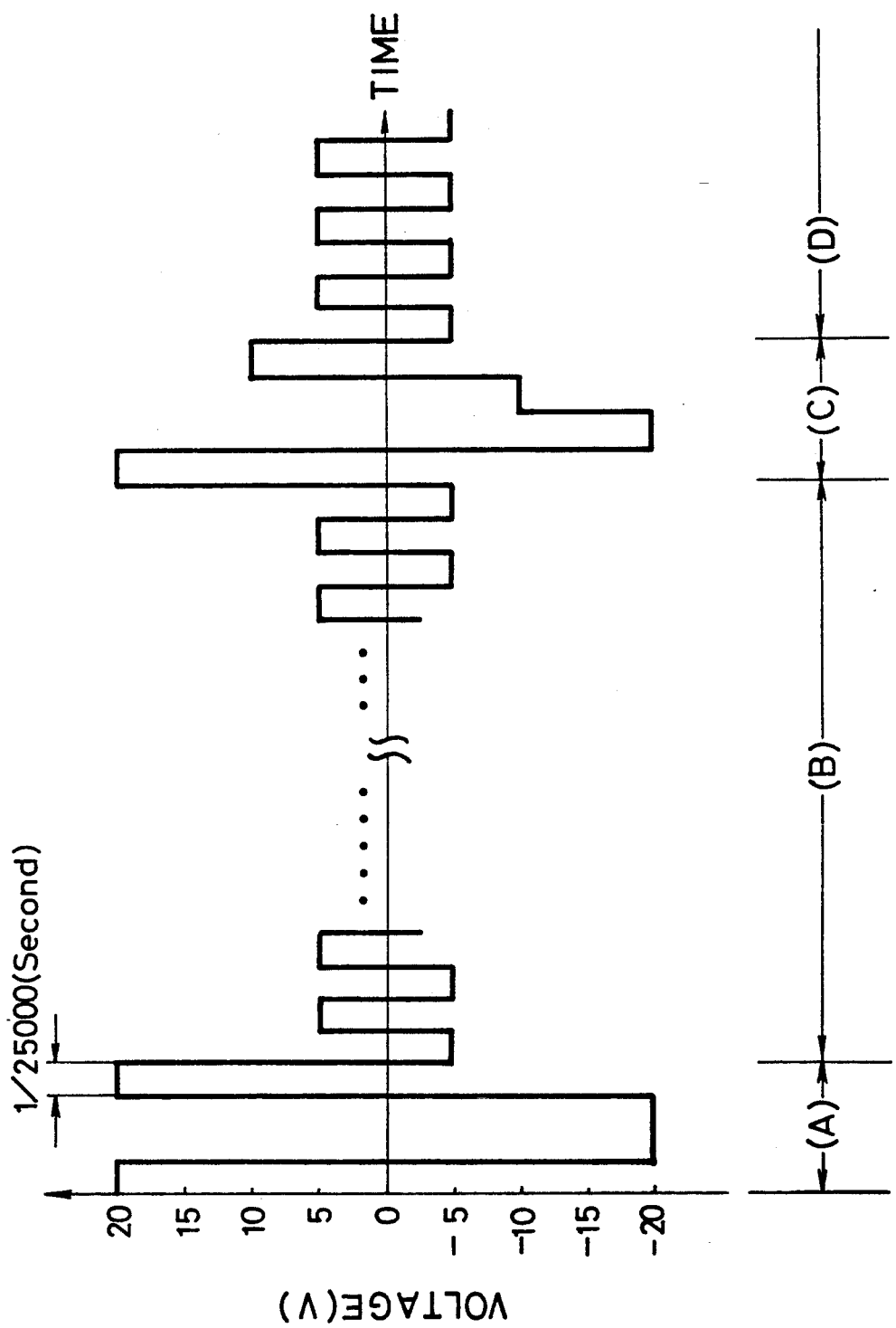
FIG. 5 is a graph showing a waveform of a voltage applied to a liquid crystal in accordance with the present invention.
Figure 6:
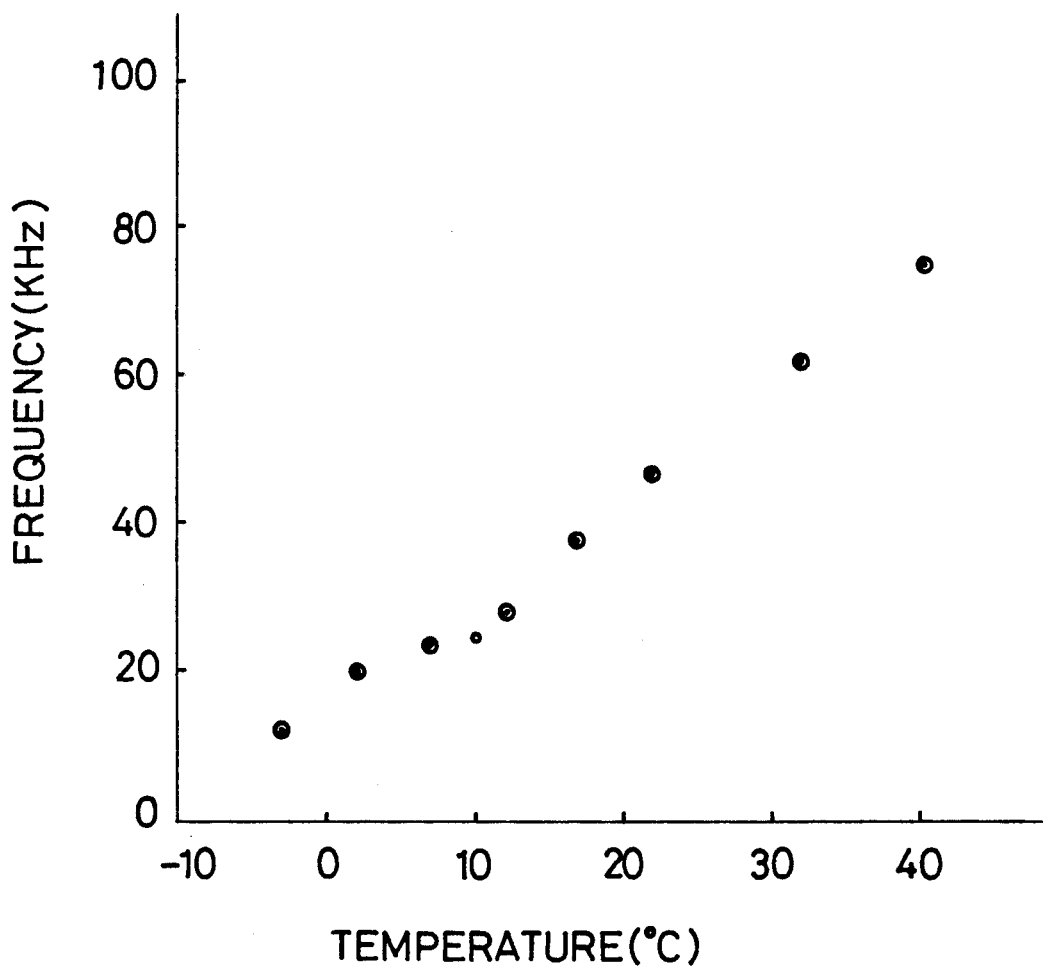
FIG. 6 is a graph showing a relationship between temperature and frequency of the voltage in accordance with the present invention.

An experimental system 26 is fabricated which comprises the liquid crystal display (LCD) 21, a TAB (tape-automated-bonding) 22, a TAB 23, a controller 24, and a personal computer system 25 as illustrated in FIG. 4. Image data are supplied from the personal computer system 25. Temperature data are obtained by detecting temperature of the liquid crystal 6 of the display 21. The controller 24 receives the image data and temperature data. The controller 24 supplies driving signals through the TABs 22 and 23 to the display 21 in response to the received image data and temperature data. Then, the ferroelectric liquid crystal is driven by alternating voltages. For example, an alternating voltage shown in FIG. 5 is applied to a picture element of the display 21 when a temperature of the liquid crystal of the display 21 is 10° C. The frequency of this alternating voltage is 25 kHz (1/25000 second) as shown in FIG. 5. In FIG. 5, voltage levels are +20 V and −20 V during period (A) and +20 V, −20 V, −10 V, and +10 V during period (C) and +5 V and −5 V during period (B) and period (D). Frequency of alternating voltage is controlled by the controller 24 in response to temperature data received by the controller 24 from the display 21. Frequency employed in this preferred embodiment is monotonically increased as temperature of the liquid crystal of the display 21 increases. For example, the frequency is 12 kHz at −3° C., 20 kHz at 2° C., 24 kHz at 7° C., 25 kHz at 10° C., 28 kHz at 12° C., 38 kHz at 17° C., 47 kHz at 22° C., 62 kHz at 32° C., and 75 kHz at 40° C. as shown in FIG. 6. During period (A) a white display starts at the picture element on the liquid crystal display. During period (B) the white display continues at the picture element since the ferroelectric liquid crystal has a memory characteristic and the voltage levels are as small as +5 V and −5 V during the period (B). During period (C) a black display takes the place of the white display. During period (D) the black display continues at the picture element.

In accordance with experiments, the dielectric anisotropy of the liquid crystal was measured to be −0.8 (10° C.) and −0.3 (40° C.) and the coefficient of viscosity thereof was 25000 cps (10° C.) and 6000 cps (40° C.). As a result, the contrast ratio was maintained between 30 and 19 even if the temperature was elevated from −3° C. to 40° C. The contrast ratio was 25 at 10° C. Thus, a high contrast white-black display was realized by virtue of control of frequency of the alternating voltage, so that very clear images could be observed.

Figure 7:
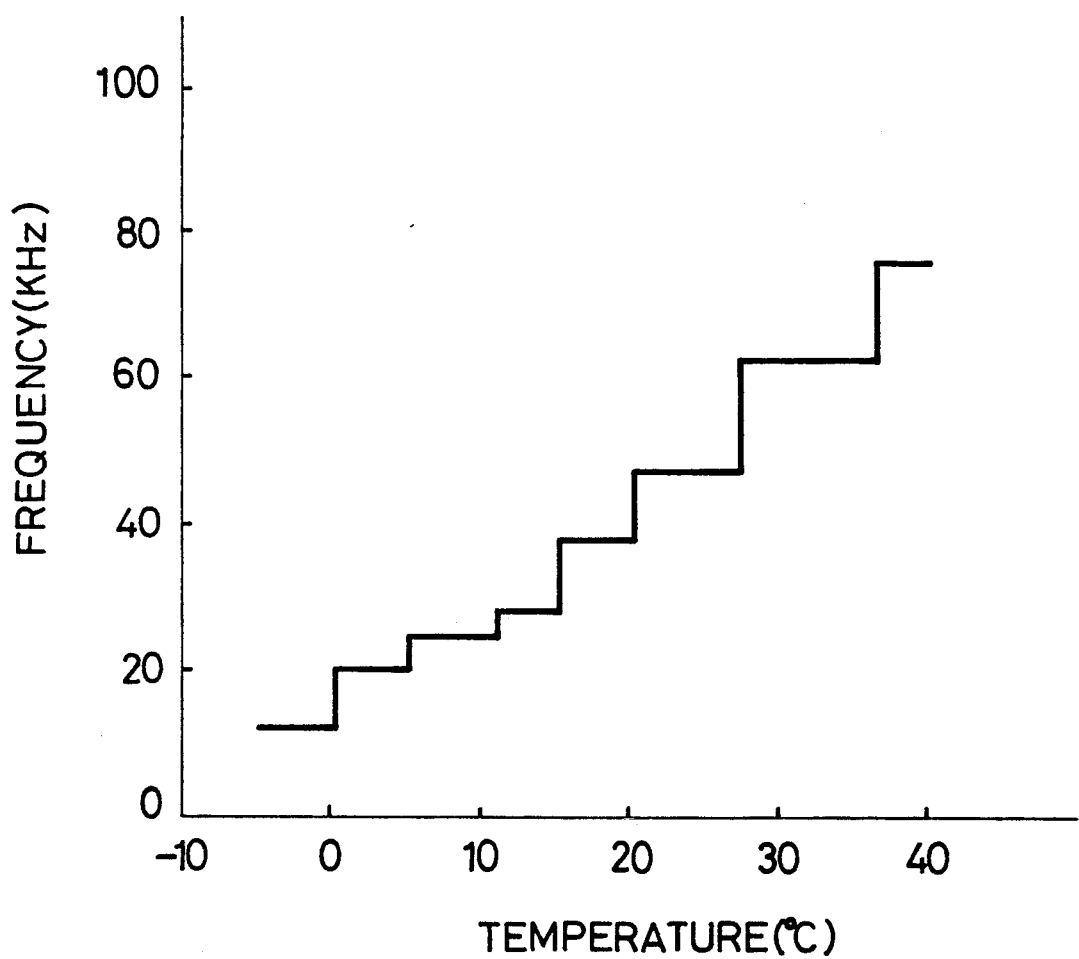
FIG. 7 is a graph showing a relationship between temperature and frequency of the voltage in accordance with the present invention.

Frequency which is increased as shown in FIG. 7 as temperature of the liquid crystal increases may be employed instead of the above described frequency. In FIG. 7, the frequency is 12 kHz from −5° to 0° C., 20 kHz from 0° C. to 5° C., 25 kHz from 5° C. to 11° C., 28 kHz from 11° C. to 15° C., 38 kHz from 15° C. to 20° C., 47 kHz from 20° C. to 27° C., 62 kHz from 27° C. to 36° C., and 75 kHz from 36° C. to 40° C. By stepwise adjusting frequency as shown in FIG. 7 a high contrast ratio no lower than 10 was maintained from −3° C. to 40° C.

The liquid crystal was replaced, for reference, by another liquid crystal whose dielectric anisotropy was −0.6 (10° C.), 0 (approx. 29° C.) and 0.4 (40° C.). The contrast ratio was significantly decreased to 7 to 9 at high temperatures no lower than 30° C. while being as high as 16 to 18 at low temperatures between 10° C. and 30° C., indicative of undesirable temperature dependence of performance. On the contrary, when the liquid crystal was replaced by a further different liquid crystal which exhibited its negative dielectric anisotropy in the same manner as the above preferred embodiment but exhibited its high viscosity, the contrast ratio was as low as 6 to 8 at low temperatures although high contrast images were maintained at high temperatures.

The voltage level of the driving signals in case of white display was controlled between ±10 V and ±20 V and the maximum voltage level in case of black display was controlled between ±10 V and ±20 V to cope with the temperature change for reference instead of the adjustment of the frequency. The frequency of the signal was kept constant (25 kHz) in this case. The contrast ratio was significantly degraded from 25 at 10° C. to 8 at 40° C.

A liquid crystal display was constructed in the same manner as the above preferred embodiment except that the polyimide film was coated on the both inside surfaces of the substrates 1 and 2 to a thickness of 150 Å. Only one of the polyimide films coated on the substrates was given rubbing treatment. The contrast ratio in this case was somewhat decreased as 16 (10° C.) to 13 (40° C.), which, however, were satisfactory in practice because contrast ratios beyond 10 were usually acceptable.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated. For example, although the above example is made in the case of liquid crystal displays, the present invention can be applied to other type of optical devices such as optical projectors through which optical images can be projected to a screen. Also the present invention can be applied to a color display and a color optical projector by the use of color filters or the like. The above described experimental system 26 is exemplary only. In practical use, the personal computer system 25 may be replaced, for example, by an antenna for receiving an electric wave of telecast or an optical disc in combination with reading means for reading image data stored on the optical disc.

What is claimed is:

1. A liquid crystal optical device comprising:
   a pair of substrates;
   an electrode pattern provided on the inside surfaces of said substrates; and
   a ferroelectric liquid crystal material disposed between said substrates,
   wherein the dielectric anisotropy of said liquid crystal material is negative at temperatures at which said optical device operates and the coefficient of viscosity of said liquid crystal material is not more than 30000 cps.

2. The liquid crystal optical device as claimed in claim 1 wherein the coefficient of viscosity of said liquid crystal material is not less than 5000 cps.

3. The liquid crystal optical device as claimed in claim 1 further comprising an orientation control film formed on the inside surface of at least one of said substrates.

4. The liquid crystal optical device as claimed in claim 3 wherein the thickness of said orientation control film is no larger than 200 Å.

5. The liquid crystal optical device as claimed in claim 4 wherein said orientation control film is made from polyimide.

6. The liquid crystal optical device as claimed in claim 3 wherein said orientation control film is formed on the inside surfaces of both of said substrates.

7. A liquid crystal optical device comprising:
   a pair of substrates;
   an electrode pattern provided on the inside surfaces of said substrates; and
   a ferroelectric liquid crystal material having a negative dielectric anisotropy disposed between said substrates and a viscosity of not more than 30000 cps at the operation temperature of the liquid crystal device,
   wherein liquid crystal molecules of said material can be made parallel to the surfaces of said substrates by virtue of said negative dielectric anisotropy by application of alternating electric fields thereto.

8. The liquid crystal optical device as claimed in claim 7 wherein the coefficient of viscosity of said liquid crystal material is between 5000 cps and 30000 cps.

9. The liquid crystal optical device as claimed in claim 7 further comprising an orientation control film having a thickness no larger than 200 Å provided on the inside surface of at least one of said substrates.

10. The liquid crystal optical device as claimed in claim 9 wherein said orientation control film is formed on the inside surfaces of both of said substrates.

* * * * *